(12) United States Patent   (10) Patent No.:   US 7,724,000 B2
Grosjean et al.             (45) Date of Patent:    May 25, 2010

(54) METHOD OF AUTOMATICALLY TESTING AN ELECTRONIC CIRCUIT WITH A CAPACITIVE SENSOR AND ELECTRONIC CIRCUIT FOR THE IMPLEMENTATION OF THE SAME

(75) Inventors: Sylvain Grosjean, Les Fins (FR); Michel Willemin, Prêles (CH)

(73) Assignee: EM Microelectronic-Marin S.A., Marin (CH)

( * ) Notice: Subject to any disclaimer, the term of this patent is extended or adjusted under 35 U.S.C. 154(b) by 266 days.

(21) Appl. No.: 12/035,286

(22) Filed: Feb. 21, 2008

(65) Prior Publication Data

US 2008/0197861 A1   Aug. 21, 2008

(30) Foreign Application Priority Data

Feb. 21, 2007   (EP) .................................. 07102811

(51) Int. Cl.
  *G01R 27/26* (2006.01)
(52) U.S. Cl. .......................... 324/661; 324/73.1; 702/65
(58) Field of Classification Search ................. 324/661, 324/73.1; 702/65; 73/1.38
  See application file for complete search history.

(56) References Cited

U.S. PATENT DOCUMENTS 5,351,519 A   10/1994 Kress
7,472,028 B2 *  12/2008 Foote .......................... 702/65

FOREIGN PATENT DOCUMENTS

DE  41 33 426 A1   4/1993
EP  0 606 115 A1   7/1994
FR  2 720 510 A1   12/1995
WO  2006/008207 A1   1/2006

OTHER PUBLICATIONS

Leutold, H. et al., "An ASIC for High-resolution Capacitive Microaccelerometers", Sensors and actuators A21-A23 (1990), pp. 278 to 281.
European Search Report issued in corresponding application No. EP 07 10 2611, completed Nov. 20, 2007.

* cited by examiner

*Primary Examiner*—Vincent Q Nguyen
(74) *Attorney, Agent, or Firm*—Griffin & Szipl, P.C.

(57) ABSTRACT

A method for automatically testing an electronic circuit with a capacitive sensor having two capacitors is provided, wherein the common electrode of the capacitors moves relative to each fixed electrode. The electronic circuit includes a sensor interface that includes a charge transfer amplifier unit, an integrator unit connected to the amplifier unit to provide measurement output voltage, and an excitation unit. The excitation unit inversely polarizes each fixed electrode at high or low voltage or discharges the capacitors. The method includes several successive measurement cycles each divided into a first phase discharging capacitors by output voltage and a second phase for polarizing the fixed electrode of the first capacitor at high voltage and inversely polarizing the fixed electrode of the second capacitor at low voltage. In the measuring cycles, a test phase replaces a second polarizing phase in at least one cycle in every two successive measurement cycles.

10 Claims, 5 Drawing Sheets

METHOD OF AUTOMATICALLY TESTING AN ELECTRONIC CIRCUIT WITH A CAPACITIVE SENSOR AND ELECTRONIC CIRCUIT FOR THE IMPLEMENTATION OF THE SAME

This application claims priority from European Patent Application No. 07102811.2 filed Feb. 21, 2007, the entire disclosure of which is incorporated herein by reference.

FIELD OF THE INVENTION

The invention concerns a method of automatically testing an electronic circuit with a capacitive sensor. The electronic circuit includes a sensor with differential mounted capacitors connected to an interface circuit of the capacitive sensor for measuring a physical parameter, such as an acceleration, an angular velocity, a force or pressure. A common electrode of the sensor is capable of moving between two fixed electrodes via the action for example of a force in order to alter the capacitive value of each capacitor. For the automatic test method, the moving electrode can be moved between the two fixed electrodes by a polarising voltage applied across the sensor. This deliberately generates an electrostatic force to be measured, thus emulating a variation in the physical quantity to be measured.

The invention also concerns an electronic circuit for implementing the automatic test method.

BACKGROUND OF THE INVENTION

In such capacitive sensors, the common moving electrode forms part for example of an armature elastically held between the two fixed electrodes. This common electrode is capable of moving some distance in the direction of one or other of the fixed electrodes via the action of a force or a pressure, for example. At rest, this common electrode is normally equidistant from the two fixed electrodes. This defines equal capacitive values for the two capacitors. When the common electrode moves via the action of a force or pressure or another physical quantity to be measured, the capacitive value of each sensor varies inversely. The interface circuit connected to the capacitive sensor is thus for providing an output signal in the form of a voltage depending upon the variation in the capacitances of the two capacitors.

The output voltage may vary linearly in an ideal case relative to the movement of the common moving electrode, which is not theoretically entirely the case if the interface circuit is integrated into a semiconductor substrate. Stray capacitors, which are added to the capacitors of the sensor, normally have to be taken into account. These stray capacitors are practically independent of the movement of the common electrode, which can create certain non-linearities. The same is true for a MEMS type sensor integrated in a semiconductor substrate, which is connected to the interface circuit to form the electronic circuit. Consequently, the electronic circuit output voltage cannot vary linearly in accordance with the movement of the common moving electrode as a function of an electrostatic force to be measured.

Generally, in order to measure a force, acceleration or pressure, the fixed electrodes of the two capacitors are polarized or excited cyclically by voltages of opposite polarity relative to an intermediate or median voltage at rest. These two polarizing voltages are for example that provided directly at the terminals of a continuous voltage source, such as a battery, namely a low voltage, which can be earth, and a high voltage. By polarizing the two fixed electrodes at different voltage levels, the charge difference across the moving electrode can be measured and converted into an output voltage of the electronic circuit. Several cycles or successive measuring periods are necessary and are each divided at least into a phase of polarizing the fixed electrodes and a phase of discharging the fixed electrodes by the output voltage. When the output voltage is stabilised at its final value, the total charge transfer of the moving electrode becomes zero. This output voltage can be provided, sampled, to a processing circuit able to provide acceleration, force, pressure or angular velocity data depending upon the structure of the sensor.

In order to check the proper operation of this type of electronic circuit with a capacitive sensor, a functionality test must be carried out either at the beginning of the operation thereof, or during force, acceleration, or pressure measuring cycles. In order to do this, an electrostatic force is deliberately and cyclically generated replacing, at least one in two times, a polarizing phase with a test phase. In this test phase, a single fixed electrode of one of the capacitors is polarized for example at the high voltage of the continuous voltage source without polarizing the other fixed electrode. Because of this unbalance, a mechanical force is thus produced on the moving electrode which will tend to be directed towards the polarized fixed electrode. At the end of this automatic test, the stabilised output voltage value enables the electrostatic force, deliberately generated for the electronic circuit operation check, to be estimated. If this test was carried out during measurement of a real force, the value of the output voltage will cumulate or subtract the dependence of the real force and the generated electrostatic force.

Figure 1:
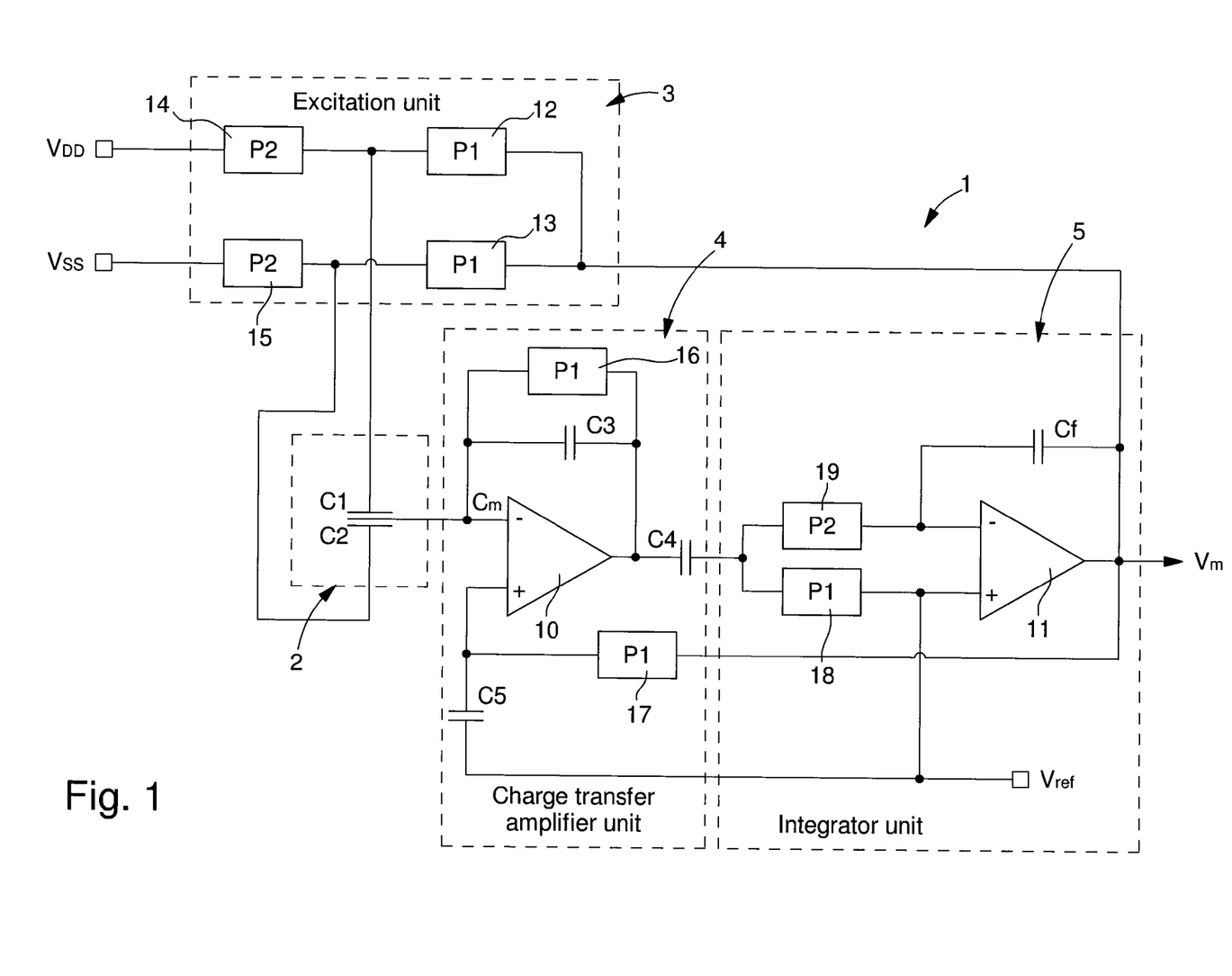
FIG. 1, already cited, shows in a simplified manner an electronic circuit with a capacitive sensor of the prior art, FIG. 2, already cited, shows a time diagram of various phases of the measuring cycles of an automatic test method of the prior art.
Figure 2:
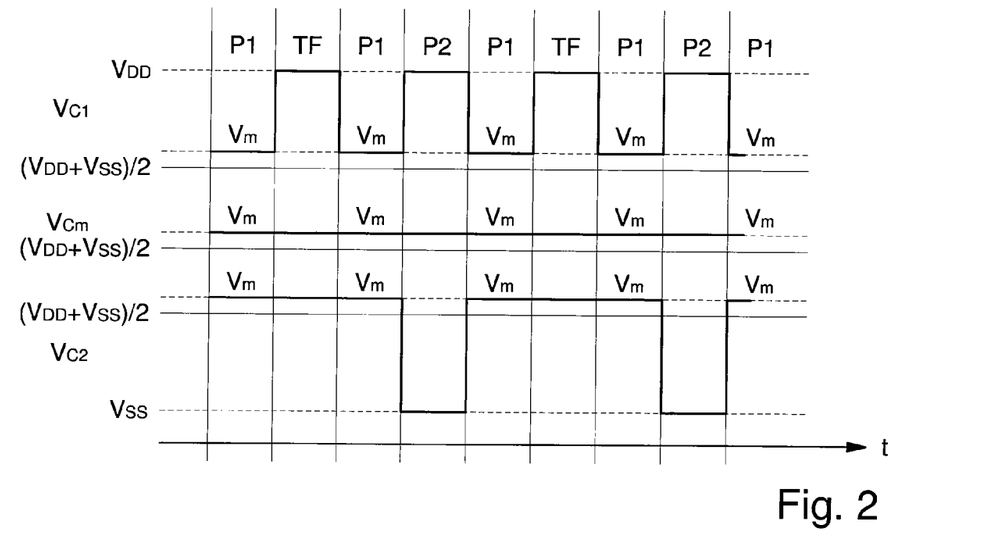

One embodiment of an electronic circuit with a capacitive sensor for implementing the automatic test method is shown in FIG. 1, in addition to the various measuring cycle phases illustrated by a time diagram of voltage signals at the sensor in FIG. 2. The electronic circuit shown is based on an electronic circuit disclosed in the article by Messrs H Leutold and F Rudolph, which appeared in the review entitled, "Sensors and actuators" A21-A23 (1990), pages 278 to 281, and also in FR Patent No. 2 720 510.

The electronic circuit 1 shown includes a capacitive sensor 2 and an interface circuit connected to the sensor for providing a measuring output signal Vm. Capacitive sensor 2 includes two differential mounted capacitors having a common electrode Cm able to move between two fixed electrodes to define two capacitors C1 and C2. The electronic interface of sensor 2 of electronic circuit 1 includes a charge transfer amplifier unit 4, which is connected at input to the common electrode Cm, an integrator unit 5 for permanently providing at output a voltage Vm equal to the integral of the charges provided by amplifier unit 4, and an excitation unit 3 for cyclically polarizing the fixed electrodes at determined voltage levels.

The charge transfer amplifier unit 4 includes an operational amplifier 10, three capacitors C3, C4 and C5 and two switches 16 and 17. The inverting input of this amplifier is connected to common electrode Cm. The capacitor C3 in parallel with switch 16 are connected between the inverting input and the output of amplifier 10. Capacitor C4 is connected between the output of amplifier 10 and the input of integrator unit 5. Capacitor C5 is connected between the non-inverting input and a voltage reference terminal Vref, which may be for example equal to $V_{SS}$. Finally, switch 17 is arranged between the output of integrator unit 5 and the non-inverting input of amplifier 10.

Integrator unit 5, which follows charge transfer amplifier unit 4, includes two input switches 18 and 19, an operational amplifier 11 and an integration capacitor Cf. This capacitor Cf is connected between the inverting input and the output of amplifier 11, which supplies the output voltage Vm of integrator 5. The input switch 18 is arranged between the output terminal of capacitor C4 of charge transfer unit and the non-inverting input of amplifier 11. The potential of this non-inverting input of amplifier 11 is fixed at the voltage reference Vref. Switch 19 is arranged between the output terminal of capacitor C4 of charge transfer unit 4 and the inverting input of amplifier 11.

Excitation unit 3 includes four switches 12, 13, 14 and 15, which can be formed by MOS switching transistors in the integrated circuit. The first switch 12 is arranged between the output of integrator 5 and the fixed electrode of capacitor C1. The second switch 13 is arranged between the output of the integrator and the fixed electrode of capacitor C2. The third switch 14 is arranged between the high voltage terminal $V_{DD}$ of a continuous voltage source and the fixed electrode of capacitor C1. Finally, the fourth switch 15 is arranged between the low voltage terminal $V_{SS}$ of the voltage source and the fixed electrode of capacitor C2.

In the normal electronic circuit operating mode, each cycle or successive measuring period is divided into two successive phases P1 and P2 as shown in part in FIG. 2. Passage from one phase to the other is controlled by clock signals that are not shown so as respectively to open or close the switches. Each switch is switched on or off taking account of time overlap or non-overlap conditions for each phase. For the first phase P1, switches 12 and 13 are closed (switched on) in order to discharge the two capacitors completely using output voltage Vm as shown by the diagrams of voltages $V_{C1}$, $V_{Cm}$ and $V_{C2}$. Switches 16, 17 and 18 are also closed, whereas switches 14 and 15 are open (switched off) in this first phase P1. In the second phase P2, switches 14 and 15 are closed, whereas switches 12, 13, 16, 17 and 18 are open. In this second phase P2, voltage $V_{DD}$ is applied to the fixed electrode C1 seen in the $V_{C1}$ diagram, whereas voltage $V_{SS}$ is applied to the fixed electrode C2 seen in the $V_{C2}$ diagram. If the moving electrode has moved a certain distance in the direction of one or other of the fixed electrodes, the capacitances of the capacitors will vary inversely. This will lead to a difference in the charge accumulated by each capacitor, which also depends upon the voltage Vm applied previously to each electrode of the capacitors.

In order to carry out the automatic test of electronic circuit 1 in a conventional manner, an electrostatic force has to be generated electronically to emulate, for example, an acceleration or another physical quantity. In order to do this in the measurement cycles, the second phase P2 is replaced at least once every two successive cycles by a test phase TF as shown in FIG. 2. In this test phase TF, only the fixed electrode of capacitor C1 is polarized at the high voltage $V_{DD}$, whereas the fixed electrode of capacitor C2 is kept at the value of the preceding output voltage Vm, just like moving electrode Cm. In this test phase TF, only switch 14 is closed, since there is no next integration operation when this electrostatic force is generated. The moving electrode is deliberately mechanically drawn towards the single polarized fixed electrode of capacitor C1, which emulates, for example, an acceleration to be measured. The movement of this moving electrode, due to the force generated during each test phase TF, is thus measured in the measurement cycles via a second measuring phase P2 that occurs once every two times alternately with each test phase.

After several operating cycles for the automatic test, the final value of voltage Vm supplies an indication of the deliberately generated electrostatic force. FIG. 2 only shows the final stabilised Vm value shown in voltage diagram $V_{Cm}$. Since the moving electrode has moved in the direction of the fixed electrode of capacitor C1, this output voltage Vm is above the intermediate or median rest voltage $(V_{DD}+V_{SS})/2$.

It will be noted that with an automatic operating test of the electronic circuit as described above, the electrostatic force generated is obtained in each test phase by polarizing only one of the fixed capacitor electrodes via the high voltage of a continuous voltage source. This polarization of one of the fixed electrodes could also be carried out with the low voltage. Consequently, this electrostatic force is greatly dependent upon the high or low voltage value which may vary given that it is supplied by a battery, which can be discharged, which is a drawback. Moreover, with an automatic test of the prior art, it is not possible to adjust or program a determined electrostatic force as a function of any type of capacitive sensor to be tested, which constitutes another drawback.

SUMMARY OF THE INVENTION

It is thus a main object of the invention to provide an automatic test method for an electronic circuit with a capacitive sensor, which overcomes the aforecited drawbacks for the operating test of any type of sensor and the electronic interface thereof independently of the variation in electronic circuit supply voltage.

The invention therefore concerns the aforecited automatic test method for an electronic circuit with a capacitive sensor, which includes the features according to a first embodiment. The first embodiment according to the present invention is a method of automatically testing an electronic circuit with a capacitive sensor, which includes two differential mounted capacitors whose common electrode is able to move relative to each fixed electrode of the two capacitors to alter the capacitive value of each capacitor during measurement of a physical parameter, the electronic circuit including the capacitive sensor and an electronic interface of the sensor, which includes a charge transfer amplifier unit connected to a moving electrode common to the sensor capacitors, an integrator unit connected to the output of the amplifier unit to integrate the charges provided by the amplifier unit and to provide a measurement output voltage, and an excitation unit arranged between the output of the integrator unit and the sensor for inversely polarizing each fixed electrode of the capacitors in operating mode at a high voltage or a low voltage of a constant voltage source relative to a median rest voltage of the sensor between the high voltage and the low voltage, or for discharging each capacitor by the output voltage of the integrator unit, wherein the automatic test method includes in normal operating mode several successive measuring cycles, each divided into at least two successive phases, which consist (a) in a first phase in discharging the two capacitors by the output voltage provided by the integrator unit and (b) in a second phase in polarizing the fixed electrode of the first capacitor by the high voltage or low voltage of the voltage source and in inversely polarizing the fixed electrode of the second capacitor by the low voltage or the high voltage of the voltage source, wherein in a test mode, the method includes a test phase replacing a second polarizing phase, which occurs in at least one cycle every several measurement cycles, in the test phase only one fixed electrode of one of the capacitors being polarized at each test phase by a polarizing voltage higher than the low voltage and lower than the high voltage, this polarizing voltage being obtained on the basis of a constant reference voltage, which is added to or subtracted from the median rest voltage of the sensor or to or from the output voltage of the integrator unit, the level of this constant reference voltage being programmed or adjusted as a function of a desired electrostatic force to be generated deliberately for the automatic test of the electronic circuit and independent of any variation in the high voltage or low voltage.

Particular advantageous steps of additional method embodiments are defined as follows. In accordance with a second embodiment of the invention, the first embodiment is modified so that the constant reference voltage is obtained on the basis of a bandgap voltage of a reference circuit, which is multiplied in a multiplier unit by a determined factor from among several stored factors representative of a desired electrostatic force to be deliberately generated for moving the moving electrode in test phase. In accordance with a third embodiment of the invention, the first embodiment is modified so that all the phases of the successive measuring cycles have an equal time duration, wherein a test phase occurs alternately with a second polarizing phase in one of every two successive cycles, and wherein the constant reference voltage is added to or subtracted from the median voltage to polarize the fixed electrode of one of the capacitors during the entire duration of each test phase. In accordance with a fourth embodiment of the invention, the first and second embodiments are modified so that in each test phase, a pulse of the constant reference voltage is added to or subtracted from the median voltage, the pulse width of the constant reference voltage having a smaller determined time duration to the duration of each test phase, the determined time duration being able to be adjusted in accordance with a desired electrostatic force to be generated. In accordance with a fifth embodiment of the invention, the first embodiment is further modified so that the electronic circuit includes two integrator units each connected at output to the amplifier unit for integrating alternately and cyclically the charges provided by the amplifier unit and for providing a first measurement output voltage for the first integrator unit and a second measuring output voltage for the second integrator unit, and two excitation units, of which the first excitation unit is arranged between the output of the first integrator unit and the sensor, and the second excitation unit is arranged between the output of the second integrator unit and the sensor, the first excitation unit polarizing the fixed electrodes of the capacitors at the high voltage for one of the fixed electrodes and at the low voltage for the other fixed electrode, or discharging each capacitor by the output voltage of the first integrator unit, whereas the second excitation unit polarizes each fixed electrode inversely to the first excitation unit with the low voltage for one of the fixed electrodes and the high voltage for the other fixed electrode, or discharges each capacitor by the output voltage of the second integrator unit, wherein the automatic test method includes, in normal operating mode, several successive measuring cycles each divided into four successive phases, which consist, (a) in a first phase, in switching on the first integrator unit with the first excitation unit and setting at rest the second integrator unit with the second excitation unit, for discharging the two capacitors by the output voltage provided by the first integrator unit, (b) in a second phase, where the first integrator unit and the first excitation unit are operating, in polarizing the fixed electrode of the first capacitor at a high voltage and the fixed electrode of the second capacitor at a low voltage, (c) in a third phase, in switching on the second integrator unit with the second excitation unit and setting at rest the first integrator unit with the first excitation unit, to discharge the two capacitors by the output voltage provided by the second integrator unit, and (d) in a fourth phase, where the second integrator unit and the second excitation unit are operating, in polarizing the fixed electrode of the first capacitor at a low voltage and the fixed electrode of the second capacitor at a high voltage, wherein in test mode, the method includes a test phase replacing a second polarizing phase, which occurs in at least one cycle every two successive measuring cycles, where only one fixed electrode of one of the capacitors is polarized at each test phase by the polarizing voltage, which is obtained by the constant reference voltage adjusted to the desired electrostatic force.

One advantage of the automatic test method for an electronic circuit with a capacitive sensor is that the electrostatic force deliberately generated in each test phase in the successive measurement cycles is totally independent of any variation in the circuit supply voltage. This electrostatic test force is programmed or adjusted by a constant reference voltage during each test phase also as a function of the type of sensor to be checked. This constant reference voltage is produced using a bandgap voltage multiplied by one factor among several stored factors depending upon the desired test force. This fixed reference voltage can be added to or subtracted from the median or intermediate rest voltage in each test phase in order to polarize only one fixed electrode of one of the two capacitors. Since this fixed reference voltage is independent of the variation in the supply voltage, the deliberately generated electrostatic force is well determined for each test of the electronic circuit. The output voltage generated provides an indication of the electrostatic force generated on the basis of the constant reference voltage.

Advantageously, the pulse width of the constant reference voltage in each test phase can be adjusted as a function of the desired electrostatic force.

The invention therefore also concerns an electronic circuit with a capacitive sensor for implementing the automatic test method, which includes the features of a sixth embodiment of the invention. In accordance with the sixth embodiment, an electronic circuit with a capacitive sensor suited for implementing the automatic test method according to the first embodiment is provided, wherein the electronic circuit includes the capacitive sensor, which includes two differential mounted capacitors whose common electrode is able to move relative to each fixed electrode of the two capacitors to alter the capacitive value of each capacitor during measurement of a physical parameter, and an electronic interface of the sensor, which includes a charge transfer amplifier unit connected to a moving electrode common to the sensor capacitors, an integrator unit connected to the output of the amplifier unit to integrate the charges provided by the amplifier unit and to provide a measurement output voltage, and an excitation unit arranged between the output of the integrator unit and the sensor for inversely polarizing each fixed electrode of the capacitors in operating mode at a high voltage or a low voltage of a constant voltage source relative to a median rest voltage of the sensor between the high voltage and the low voltage, or for discharging each capacitor by the output voltage of the integrator unit, wherein it includes a multiplier unit for multiplying a bandgap voltage of a reference circuit, by a determined factor from among several stored factors representative of a desired electrostatic force to be generated deliberately, in order to produce a constant reference voltage to be added to or subtracted from the median voltage in order to polarize only one of the fixed electrodes in each test phase of the electronic circuit.

Particular other embodiments of the electronic circuit, in accordance with the present invention, are defined as follows. In accordance with a seventh embodiment of the invention, the sixth embodiment is further modified so that it further includes a switch arranged between the output of the multiplier unit and one of the fixed electrodes of the capacitors to be polarized in each test phase, the switch controlled by clock signals being closed in each test phase, and wherein the multiplier unit is controlled by a selection signal for generating a constant reference voltage pulse added to or subtracted from the median rest voltage, which has a determined time duration less than the duration of each test phase, in order to adjust the electrostatic force to be generated in each test phase. In accordance with an eighth embodiment of the invention, the sixth and seventh embodiments are further modified to include two integrator units each connected to the output of the amplifier unit to integrate alternately and cyclically charges provided by the amplifier unit and to provide a first measurement output voltage for the first integrator unit and a second measurement output voltage for the second integrator unit, and two excitation units, of which the first excitation unit is arranged between the output of the first integrator unit and the sensor, and the second excitation unit is arranged between the output of the second integrator unit and the sensor, the first excitation unit polarizing the fixed electrodes of the capacitors at the high voltage for one of the fixed electrodes and at the low voltage for the other fixed electrode, or discharging each capacitor by the output voltage of the first integrator unit, whereas the second excitation unit polarizes each fixed electrode inversely to the first excitation unit with the low voltage for one of the fixed electrodes and the high voltage for the other fixed electrode, or discharges each capacitor by the output voltage of the second integrator unit.

BRIEF DESCRIPTION OF THE DRAWINGS

The objects, advantages and features of the automatic test method for an electronic circuit with a capacitive sensor, and the electronic circuit for the implementation of the same, will appear more clearly in the following description with reference to the drawings, in which.

DETAILED DESCRIPTION OF THE INVENTION

In the following description, since the components of the electronic circuit with a capacitive sensor having two differential mounted capacitors are well known, they will not be explained in detail.

Figure 3:
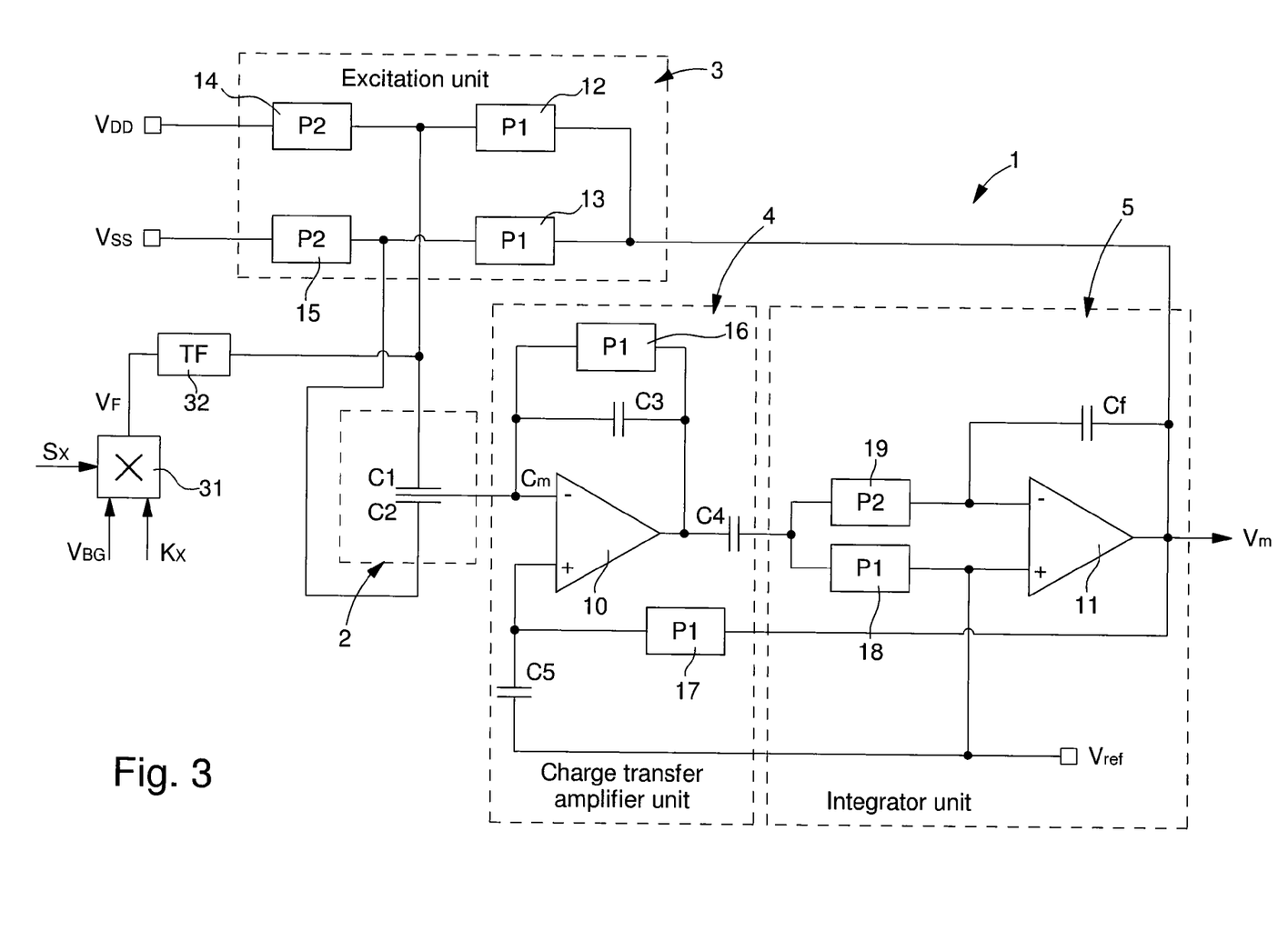
FIG. 3 shows in a simplified manner a first embodiment of an electronic circuit with a capacitive sensor for implementing the automatic test method according to the invention.

FIG. 3 shows a simplified diagram of the various components of the electronic circuit 1 with a capacitive sensor 2 for implementing the automatic test method according to the invention. This first embodiment of electronic circuit 1 includes a capacitive sensor 2 and an interface circuit connected to the sensor to supply a measuring output voltage Vm. Capacitive sensor 2 includes two differential mounted capacitors C1 and C2 having a common electrode Cm able to move between two fixed electrodes on the two capacitors.

The electronic interface of sensor 2 of electronic circuit 1 includes a charge transfer amplifier unit 4, which is connected at input to common electrode Cm, an integrator unit 5 for permanently supply at output a voltage Vm equal to the integral of the charges supplied by amplifier unit 4, and an excitation unit 3 for cyclically polarizing the fixed electrodes at determined voltage levels. Since amplifier unit 4, integrator unit 5 and excitation unit 3 of this first embodiment of electronic circuit 1 include identical elements to those described with reference to FIG. 1, they will not be explained in further detail.

The essential difference of this first embodiment of electronic circuit 1 of FIG. 3 compared to the electronic circuit of FIG. 1, is that it includes means for generating a constant reference voltage. This constant reference voltage is added to or subtracted from the intermediate rest voltage $(V_{DD}+V_{SS})/2$ so as to be applied across one of the fixed capacitor electrodes during the test phase. The constant reference voltage added to or subtracted from the intermediate voltage is preferably applied only across the fixed electrode of capacitor C1 in a test phase, which alternately replaces a polarization phase for example every two successive measuring cycles.

The constant reference voltage is obtained on the basis of a bandgap voltage $V_{BG}$, which is multiplied in a multiplier unit 31 by a factor $K_x$. This bandgap voltage is well known in the field of integrated circuit design, since it supplies a voltage of determined value of the order of 1.16 V, which is independent of temperature. Since the method of making a reference circuit to obtain a bandgap voltage $V_{BG}$ is well known in this technical field, it will not be explained below.

Factor $K_x$ is representative of the electrostatic force to be generated for the automatic test method of the electronic circuit. Several factors $K_x$ can be stored in a non-volatile memory, not shown, which is devised on the same substrate as the electronic interface of capacitive sensor 2. Each factor can be stored and selected as a function of the type of capacitive sensor to be tested or the desired electrostatic force to be imposed on the sensor in the automatic test.

Multiplier unit 31 can be made in a known manner for example using a switched capacitor configuration or also using a resistive divider configuration. This multiplier unit can be referenced at the intermediate voltage $(V_{DD}+V_{SS})/2$ so as to supply easily at output a referenced voltage $V_F$, which includes for example the addition of voltage $K_x \cdot V_{BG}$ and the median rest voltage $(V_{DD}+V_{SS})/2$. The intermediate rest voltage can be equal to $V_{DD}/2$ if $V_{SS}$ is at earth. Of course, the reference circuit generating the bandgap voltage $V_{BG}$ can also be referenced at the intermediate voltage $(V_{DD}+V_{SS})/2$. A selection signal $S_x$ controls the multiplier unit 31 to supply at output a voltage $V_F$, which may either be the median rest voltage during one part of each test phase, or the addition or subtraction of a pulse of reference voltage $K_x \cdot V_{BG}$ to or from the median voltage during a determined period, which may be the total period of each test phase.

In a test phase as explained below with reference to FIG. 4, this voltage $V_F$ is applied directly across the fixed electrode of capacitor C1. In order to do this, a switch 32, which is arranged between the output of the multiplier unit 31 and the fixed electrode of capacitor C1, is closed in this test phase, whereas all the other switches are open.

It should be noted that such an automatic test occasionally occurs only during the whole operation time period of the electronic circuit with a minimum of supplementary electronic components. The electric consumption during the automatic test is insignificant in relation to the entire consumption of electronic circuit.

Figure 4:
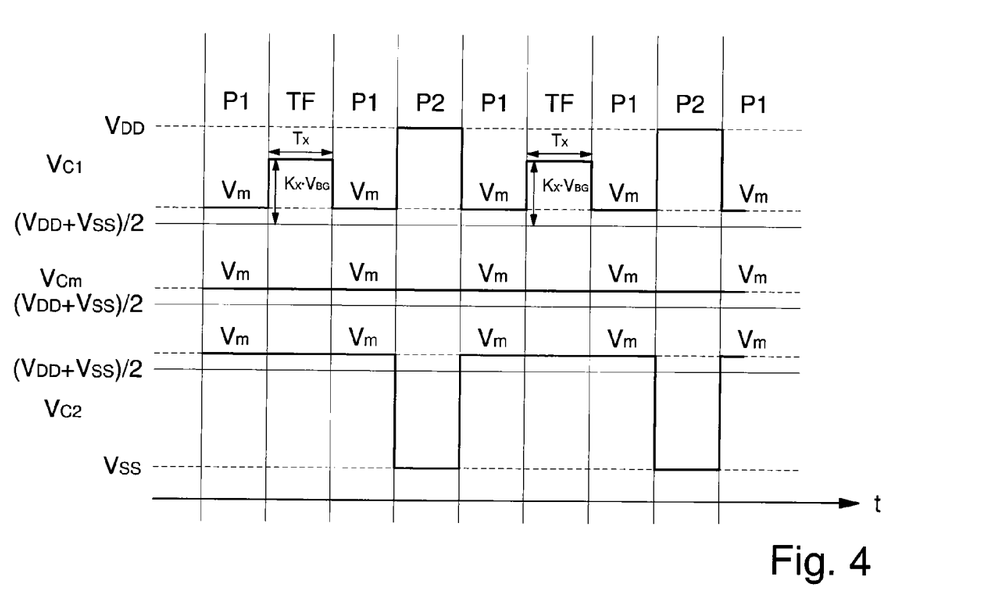
FIG. 4 shows a time diagram of various measuring cycle phases of an automatic test method according to the invention for the electronic circuit of FIG. 3.

FIG. 4 shows a time diagram of various measuring cycle phases of an automatic test method according to the invention for the electronic circuit of FIG. 3. Each phase normally has an equal time period during the entire automatic test method. Only the voltage signals $V_{C1}$, $V_{C2}$ and $V_{Cm}$ across the two fixed electrodes of capacitors C1 and C2 and moving electrode Cm are shown. Of course, for the sake of simplification, the various phases of the automatic test method are shown whereas the output voltage Vm is already stabilised.

It should be noted that this automatic test can occur either at the start of the operation of the electronic circuit, or during a real measurement for example of a force. If this electronic circuit is used in a vehicle "airbag" system, the automatic test already occurs when the vehicle is started.

The arrangement principle of the various measuring phases is identical to that described above with reference to FIG. 2. For the automatic test method according to the invention, it is only the constant voltage value applied to the fixed electrode of capacitor C1, which is different in the test phase TF. With respect to the median rest voltage $(V_{DD}+V_{SS})/2$, a constant reference voltage $K_x \cdot V_{BG}$ is added to this intermediate voltage as a function of the desired electrostatic force. The value of this reference voltage is constant during the entire duration of each test phase TF, but it can be changed as a function of the type of sensor to be tested or in order to modify at will the electrostatic force to be generated.

In normal operating mode, several successive measuring cycles, for example 50 cycles, are necessary to obtain a final stabilised output voltage value. This number of cycles is dependent upon the time constant of the electronic circuit with the capacitive sensor. Each normal measuring cycle for the electronic circuit of this first embodiment includes a first phase P1 and a second phase P2. The first phase P1 completely discharges the two capacitors using output voltage Vm supplied by the integrator unit as shown by voltage diagrams $V_{C1}$, $V_{Cm}$ and $V_{C2}$. The second phase P2 polarizes the fixed electrodes of capacitors C1 and C2. In this second phase P2, voltage $V_{DD}$ is applied to fixed electrode C1 seen in diagram $V_{C1}$, whereas voltage $V_{SS}$ is applied to the fixed electrode C2 seen in diagram $V_{C2}$.

Since an electrostatic force is deliberately generated in each test phase TF without any integration being carried out following the test phase, the moving electrode has moved a certain distance in the direction of the fixed electrode of capacitor C1. Consequently, the second polarization phase P2 thus measures the movement of the moving electrode by a charge transfer and a subsequent integration operation by the integrator unit.

Upon examining the diagrams shown in FIG. 4, it will be noted that following each first phase P1, there is an alternation of test phases TF and polarization phases P2 in the series of cycles. For the automatic test method, once every two successive cycles, a test phase TF occurs. In the time order of the diagrams of FIG. 4, the first phase P1 first occurs, in which each electrode of the capacitors is discharged to the value of output voltage Vm. Following this first phase P1, a test phase TF occurs for which the fixed electrode of second capacitor C2 and the moving electrode remain at the potential Vm. However, the fixed electrode of the first capacitor C1 is polarized during the entire test phase at a constant reference voltage $K_x \cdot V_{BG}$ above the intermediate voltage $(V_{DD}+V_{SS})/2$. This constant reference voltage is independent of any supply voltage variation since it is referenced with respect to a median rest voltage. This test phase TF is followed by a first phase P1 in which all of the electrodes are discharged to output voltage Vm. After this first phase P1, a second polarization phase P2 occurs for measuring the movement of the moving electrode that occurred after test phase TF. This phase arrangement is repeated cyclically until the end of the automatic electronic circuit test.

Of course, in each test phase TF, one could also have envisaged altering the width of the constant reference voltage pulse $T_x$ during the period of each test phase like a pulse width modulation (PWM). This pulse width is controlled by a selection signal applied to the multiplier unit. This also allows various electrostatic force values to be trimmed or altered while keeping a constant reference voltage level. One could also envisage a test phase replacing phase P2 every three, four or five successive measuring cycles rather than every two successive cycles.

Figure 5:
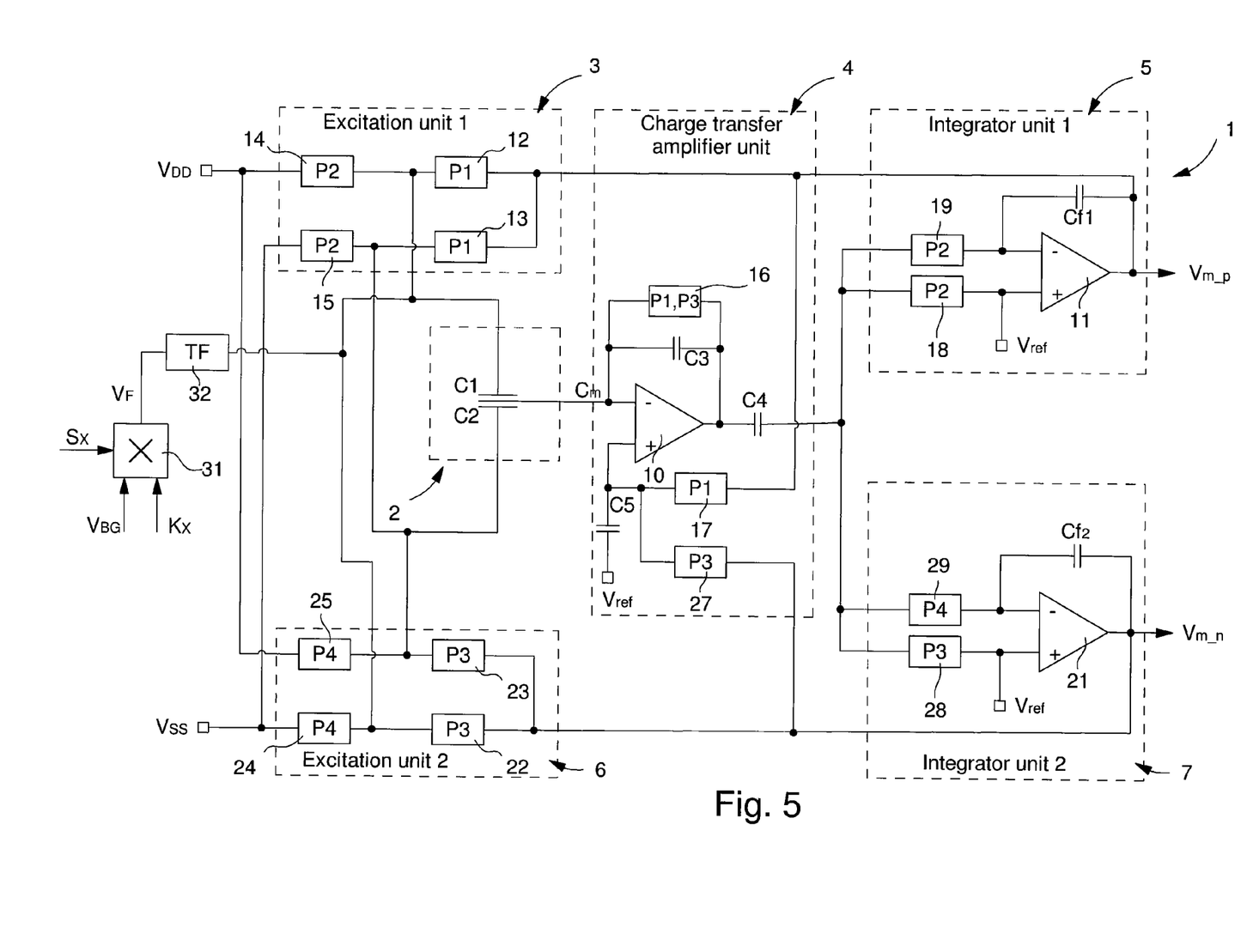
FIG. 5 shows in a simplified manner a second embodiment of an electronic circuit with a capacitive sensor for implementing the automatic test method according to the invention.

FIG. 5 shows a second embodiment of electronic circuit 1. Electronic circuit 1 includes a charge transfer amplifier circuit 4, which is connected at input to the common electrode Cm, a first integrator unit 5 and a second integrator unit 7 of identical structure connected to capacitor C4 at the output of amplifier unit 4, a first excitation unit 3 arranged between the output of the first integrator unit 5 and sensor 2, and a second excitation unit 6 arranged between the output of second integrator unit 7 and sensor 2. The first integrator unit 5 permanently supplies an output voltage Vm_p equal to the integral of the charges supplied by amplifier unit 4, whereas the second integrator unit 7 permanently supplies at output a voltage Vm_n inverse to voltage Vm_p relative to an intermediate or median rest voltage $(V_{DD}+V_{SS})/2$. Each excitation unit 3 and 6 alternately and cyclically polarizes the fixed electrodes at specified voltage levels as described below.

Multiplier unit 31 and switch 32 are identical to those explained with reference to FIG. 3. A constant reference voltage is obtained by multiplying a bandgap voltage $V_{BG}$ by a factor $K_x$ dependent upon the sensor to be tested and the value of the electrostatic force to be generated. A selection signal $S_x$ controls the multiplier unit 31 to supply at output a voltage $V_F$, which may either be the median rest voltage during a part of each test phase, or the addition of a pulse of the reference voltage $K_x \cdot V_{BG}$ to the median voltage during a determined period in each test phase.

In normal operating mode, each measuring cycle is made up of four successive phases P1, P2, P3 and P4. A first phase P1 of discharging the electrodes of capacitors C1 and C2 via the output voltage Vm_p of the first integrator unit 5, followed by a second polarizing phase P2 via first excitation unit 3. A third phase P3 of discharging the electrodes of capacitors C1 and C2 via the output voltage Vm_n of the second integrator unit 7, followed by a fourth inverse polarizing phase P4 via the second excitation unit 6. Because of this phase arrangement in each measuring cycle, it is thus possible to symmetrize operation of the electronic circuit and thus to compensate for the non-linearities due, for example, to stray capacitors.

The first excitation unit 3 includes four switches 12, 13, 14 and 15, which may be formed by MOS switching transistors in the integrated circuit. As for the electronic circuit of FIGS. 1 and 3, the first switch 12 is arranged between the output of first integrator unit 5 and the fixed electrode of capacitor C1. The second switch 13 is arranged between the output of the first integrator unit and the fixed electrode of capacitor C2. The third switch 14 is arranged between the high voltage terminal $V_{DD}$ of a constant voltage source and the fixed electrode of capacitor C1. Finally, the fourth switch 15 is arranged between the low voltage terminal $V_{SS}$ of the voltage source and the fixed electrode of capacitor C2.

The second excitation unit 6 has a similar structure to first excitation unit 3. This second excitation unit 6 also includes four switches 22, 23, 24 and 25 formed by MOS transistors in the integrated circuit. The first switch 22 is arranged between the output of second integrator unit 7 and the fixed electrode of capacitor C1. The second switch 23 is arranged between the output of the second integrator unit 7 and the fixed electrode of capacitor C2. The third switch 24 is arranged between the low voltage terminal $V_{SS}$ and the fixed electrode of capacitor C1. Finally, the fourth switch 25 is arranged between the high voltage terminal $V_{DD}$ and the fixed electrode of capacitor C2.

The charge transfer amplifier 4 and first integrator unit 5 include identical elements to those described with reference to FIGS. 1 and 3. Only the reference Cf1 of the first integrator unit 5 is different. Consequently, for the sake of simplicity, these elements will not all be explained again.

The second integrator unit 7, which follows amplifier unit 4, also includes two input switches 28 and 29, an operational amplifier 21 and an integration capacitor Cf2. This capacitor Cf2 is connected between the inverting input and the output of amplifier 21, which supplies the output voltage Vm_n of second integrator unit 7. The input switch 28 is arranged between the output terminal of capacitor C4 of charge transfer unit 4 and the non-inverting input of amplifier 21. The potential of this non-inverting input of amplifier 21 is fixed at the voltage reference Vref. Switch 29 is arranged between the output terminal of capacitor C4 of charge transfer unit 4 and the inverting input of amplifier 21. Finally, a switch 27 is arranged between the output of second integrator unit 7 and the non-inverting input of amplifier 10.

Figure 6:
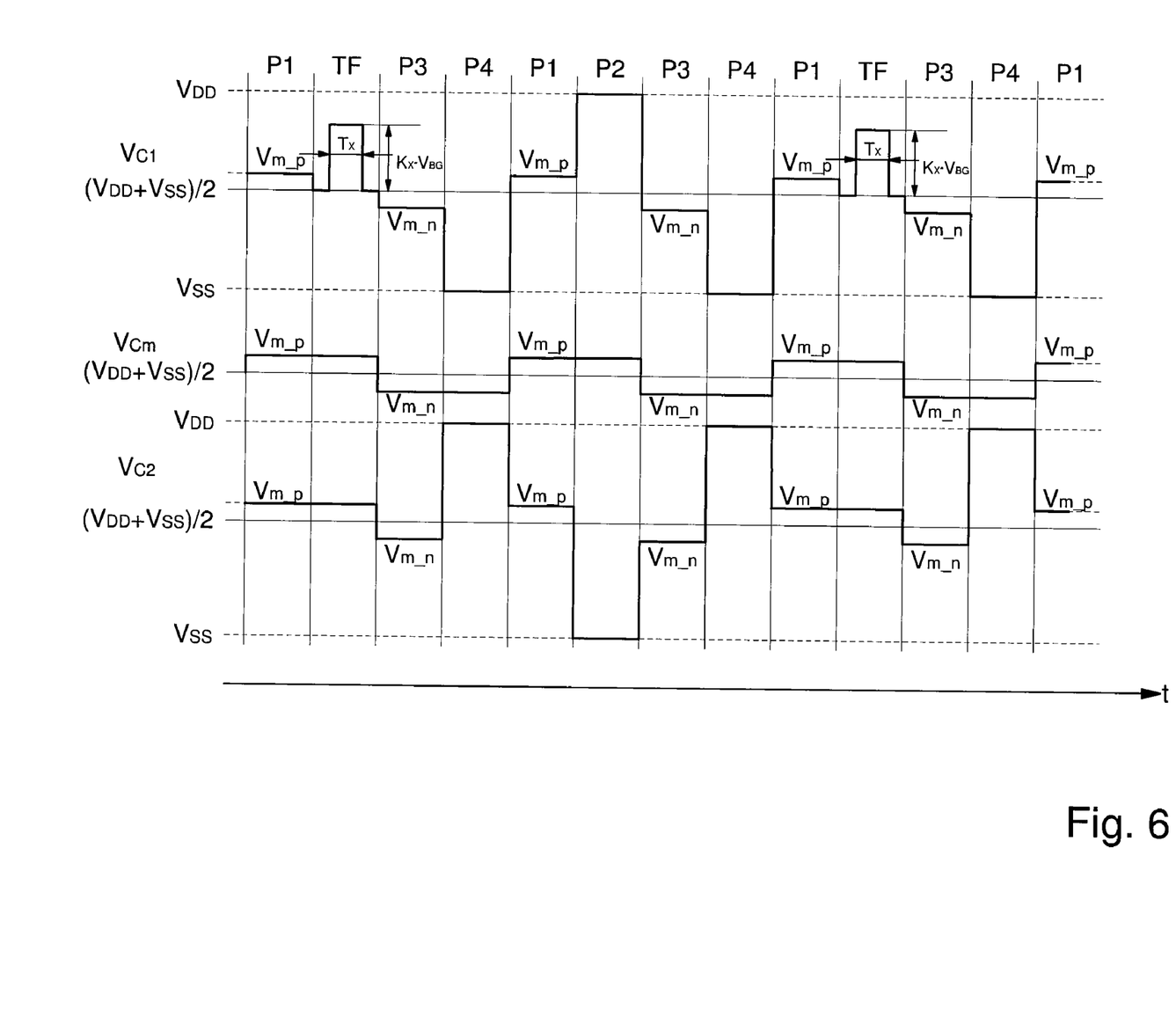
FIG. 6 shows a time diagram of various measuring cycle phases of an automatic test method according to the invention for the electronic circuit of FIG. 5.

For the automatic test method of the electronic circuit in operating mode, each normal cycle or successive operating period is divided into four phases P1 to P4 as shown in part in FIG. 6. Passage from one phase to another is controlled by clock signals that are not shown in order, respectively, to open or close the switches of the first and second excitation units 3 and 6. The switches of the different units are closed in each measuring cycle as a function of the number of the corresponding phase indicated in the frames of each switch shown in FIG. 5. In the first two phases P1 and P2, the first integrator unit 5, and the first excitation unit 3 are operating, whereas in the third and fourth phases P3 and P4, the second integrator unit 7, and the second excitation unit 6 are operating. Consequently, at each half-period of a normal measuring cycle, the first integrator unit 5 and first excitation unit 3, and the second integrator unit 7 and second excitation unit 6 are alternately switched on symmetrically. This linearizes the measurements made by the electronic circuit using the two output voltages Vm_p and Vm_n generated.

As explained with reference to FIGS. 2 and 4, a test phase TF for generating a deliberate electrostatic force, occurs at least once every two successive cycles replacing the polarization phase P2. In this test phase TF, the electrostatic force is generated by polarizing only the fixed electrode of capacitor C1 at a constant reference voltage $K_x \cdot V_{BG}$ for example above the intermediate or median rest voltage $(V_{DD}+V_{SS})/2$. The fixed electrode of capacitor C2 and the moving electrode Cm remain at the output voltage Vm_p of the first integrator unit. However, in FIG. 6, this constant reference voltage $K_x \cdot V_{BG}$ has a pulse width with a determined time duration $T_x$ smaller than the duration of the test phase as a function of the desired electrostatic force. By keeping a constant level of the reference voltage, it is thus possible to alter the force to be generated simply by adjusting the width of this pulse in each test phase TF.

With reference to the voltage diagrams $V_{C1}$, $V_{Cm}$ and $V_{C2}$ shown in FIG. 6, the various phases of the automatic test are explained in chronological order. Of course, for the sake of simplification, only the stabilised output voltages Vm_p and Vm_n are shown.

First of all in first phase P1, the voltage Vm_p present at the output of the first integrator unit is applied to each electrode of the sensor. This voltage is above the intermediate rest voltage $(V_{DD}+V_{SS})/2$. This allows the two capacitors to be completely discharged as shown by voltage diagrams $V_{C1}$, $V_{Cm}$ and $V_{C2}$. After this first phase, a test phase TF occurs. In the test phase only the fixed electrode of capacitor C1 is polarized by a constant reference voltage pulse $K_x \cdot V_{BG}$ of duration $T_x$ added to the median rest voltage $(V_{DD}+V_{SS})/2$. In the test phase, only the switch connected to the multiplier unit is closed, since there must be no integration following the deliberately generated electrostatic force. In phase P3, the voltage Vm_n present at the output of the second integrator unit is applied to each electrode of the sensor. This voltage Vm_n is below the intermediate or median rest voltage $(V_{DD}+V_{SS})/2$. In phase P4, the fixed electrode of the second capacitor C2 is inversely polarized to $V_{DD}$.

After this phase P4, a normal measuring cycle occurs where in phase P1 a charge transfer integration occurs after the preceding phase P4 occurs in the second integrator unit in order to provide the output voltage Vm_n in phase P3. In this new phase P1, the voltage Vm_p present at the output of the first integrator unit is again applied to each electrode of the sensor. However, after this phase P1, a normal polarizing phase P2 occurs to polarize the fixed electrode of capacitor C1 at $V_{DD}$ and to polarize the fixed electrode of capacitor C2 at $V_{SS}$. In this way, after the movement of the moving electrode imposed by the generated electrostatic force, the first integrator unit can carry out a charge transfer and integration in phase P3 after phase P2. Phases P3 and P4 are identical in all of the successive measuring cycles.

After several measuring cycles, for example 50 cycles, the final voltage gap between Vm_p and $(V_{DD}+V_{SS})/2$ and the final voltage gap between Vm_n and $(V_{DD}+V_{SS})/2$ are equal. This means that two measuring signals can be processed in a processing circuit that is not shown so as to compensate for the aforementioned non-linearities.

Since the test phase TF only occurs once every two successive cycles replacing a polarization phase P2, the first integrator unit output voltage Vm_p converges on its final stabilised value two times slower than the second integrator unit output voltage Vm_n. However, the two stabilised output voltages Vm_p and Vm_n allow the deliberately generated electrostatic force to be estimated, which is proportional to $((V_{DD}+V_{SS})/2)^2$ for the electronic circuit operating check.

Of course, one could also envisage a test phase TF replacing phase P2 every three, four or five successive measurement cycles rather than every two successive cycles, as described above. Moreover, the on period of each switch in each of the phases could be slightly shifted and different in time from the others to avoid causing interference in the various steps during passage from one phase to another.

In order to give a non-limiting order of magnitude as regards the scope of the invention, the capacitance C1 or C2 of each capacitor could be of the order of 450 fF at rest. The capacitance of capacitor C3 could be of the order of 600 fF. The capacitance of capacitor C4 could be of the order of 1 pF. The capacitance of capacitor C5 could be of the order of 1.8 pF. Finally, the capacitance of capacitors Cf1 and Cf2 could be of the order of 5 pF. Each phase of each cycle is approximately of the order of 6 µs, which gives a final measuring voltage in the automatic test method afterwards of around 1 ms. Moreover, the sensor could be configured such that electronic circuit 1 supplies a voltage gap between the output voltage Vm_p and the intermediate voltage $(V_{DD}+V_{SS})/2$ of 20 mv for 1 g of acceleration for example.

From the description that has just been given, multiple variants of the automatic test method for the electronic circuit with a capacitive sensor and of the electronic circuit can be devised by those skilled in the art, without departing from the scope of the invention defined by the claims. One could envisage polarizing the fixed electrode of the second capacitor instead of the fixed electrode of the first capacitor. Moreover, in each test phase, the constant reference voltage could be subtracted from or added to the median rest voltage or an output voltage to generate an electrostatic force tending to move the moving electrode closer to the fixed electrode of the second capacitor. This electrostatic force may be altered during the test either by changing the multiplication factor of the bandgap voltage, or the duration of the constant reference voltage pulse, or both. Each test phase could also occur in place of two polarizing phases at least once in every two successive cycles.

What is claimed is:

1. A method of automatically testing an electronic circuit with a capacitive sensor, wherein the capacitive sensor includes two differential mounted capacitors whose common first electrode is able to move relative to each fixed second electrode of the two capacitors to alter capacitive value of each capacitor during measurement of a physical parameter, and the electronic circuit includes the capacitive sensor and an electronic interface of the sensor, wherein the electronic interface includes a charge transfer amplifier unit connected to a moving third electrode common to the two capacitors of the sensor, an integrator unit connected to an output of the amplifier unit to integrate charges provided by the amplifier unit and to provide a measurement output voltage, and an excitation unit arranged between an output of the integrator unit and the sensor for inversely polarizing each fixed second electrode of the capacitors in operating mode at a high voltage or a low voltage of a constant voltage source relative to a median rest voltage of the sensor between the high voltage and the low voltage, or for discharging each capacitor by an output voltage of the integrator unit, wherein the automatic test method includes, in normal operating mode, several successive measuring cycles, each divided into at least two successive phases, wherein the at least two successive phases comprise:
(a) in a first phase, in discharging the two capacitors by the output voltage provided by the integrator unit; and
(b) in a second phase, in polarizing the fixed second electrode of a first capacitor of the two differential mounted capacitors by the high voltage or the low voltage of the voltage source and in inversely polarizing the fixed second electrode of a second capacitor of the two differential mounted capacitors by the low voltage or the high voltage of the voltage source,
wherein in a test mode, the method further includes a test phase replacing a polarizing second phase, wherein the test phase occurs in at least one cycle every several measurement cycles, and in the test phase only one fixed second electrode of one of the two capacitors is polarized at each test phase by a polarizing voltage higher than the low voltage and lower than the high voltage, wherein the polarizing voltage is obtained on the basis of a constant reference voltage that is added to or subtracted from the median rest voltage of the sensor or to or from the output voltage of the integrator unit, the constant reference voltage is programmed or adjusted as a function of a desired electrostatic force to be generated deliberately for an automatic test of the electronic circuit and is independent of any variation in the high voltage or low voltage.

2. The automatic test method according to claim 1, wherein the constant reference voltage is obtained on the basis of a bandgap voltage of a reference circuit, wherein the bandgap voltage is multiplied in a multiplier unit by a determined factor from among several stored factors representative of a desired electrostatic force to be deliberately generated for moving the moving first electrode in test phase.

3. The automatic test method according to claim 2, wherein in each test phase, a pulse of the constant reference voltage is added to or subtracted from the median voltage, and the pulse width of the constant reference voltage has a smaller determined time duration to the duration of each test phase, and the determined time duration is able to be adjusted in accordance with a desired electrostatic force to be generated.

4. The automatic test method according to claim 1, wherein all the phases of the successive measuring cycles have an equal time duration, wherein a test phase occurs alternately with a polarizing second phase in one of every two successive cycles, and wherein the constant reference voltage is added to or subtracted from the median voltage to polarize the fixed second electrode of one of the two capacitors during the entire duration of each test phase.

5. The automatic test method according to claim 1, wherein in each test phase, a pulse of the constant reference voltage is added to or subtracted from the median voltage, and the pulse width of the constant reference voltage has a smaller determined time duration to the duration of each test phase, and the determined time duration is able to be adjusted in accordance with a desired electrostatic force to be generated.

6. The automatic test method according to claim 1, wherein the electronic circuit includes two integrator units, each connected at an output to the amplifier unit for integrating alternately and cyclically charges provided by the amplifier unit and for providing a first measurement output voltage for the first integrator unit and a second measuring output voltage for the second integrator unit, and two excitation units, of which the first excitation unit is arranged between the output of the first integrator unit and the sensor, and the second excitation unit is arranged between the output of the second integrator unit and the sensor, wherein the first excitation unit polarizes the fixed second electrodes of the two capacitors at the high voltage for one of the fixed second electrodes and at the low voltage for the other fixed second electrode, or discharging each capacitor by the output voltage of the first integrator unit, whereas the second excitation unit polarizes each fixed second electrode inversely to the first excitation unit with the low voltage for one of the fixed second electrodes and the high voltage for the other fixed second electrode, or discharges each capacitor by the output voltage of the second integrator unit, wherein the automatic test method includes, in normal operating mode, several successive measuring cycles, each divided into four successive phases, wherein the at least four successive phases comprise:
(a) in a first phase, switching on the first integrator unit with the first excitation unit and setting at rest the second integrator unit with the second excitation unit for discharging the two capacitors by the output voltage provided by the first integrator unit;
(b) in a second phase, where the first integrator unit and the first excitation unit are operating, polarizing the fixed second electrode of a first capacitor of the two differential mounted capacitors at a high voltage and the fixed second electrode of a second capacitor of the two differential mounted capacitors at a low voltage;

(c) in a third phase, switching on the second integrator unit with the second excitation unit and setting at rest the first integrator unit with the first excitation unit in order to discharge the two capacitors by the output voltage provided by the second integrator unit; and (d) in a fourth phase, where the second integrator unit and the second excitation unit are operating, polarizing the fixed second electrode of the first capacitor at a low voltage and the fixed second electrode of the second capacitor at a high voltage;

wherein in test mode, the method further includes a test phase replacing a polarizing second phase, wherein the test phase occurs in at least one cycle every two successive measuring cycles, wherein only one fixed second electrode of one of the two capacitors is polarized at each test phase by the polarizing voltage, wherein the polarizing voltage is obtained by the constant reference voltage adjusted to the desired electrostatic force.

7. The electronic circuit with a capacitive sensor suited for implementing an automatic test method, wherein the electronic circuit includes:

(a) the capacitive sensor, wherein the capacitive sensor includes
   i. two differential mounted capacitors whose common first electrode is able to move relative to each fixed second electrode of the two capacitors to alter capacitive value of each capacitor during measurement of a physical parameter; and
   ii. an electronic interface of the sensor, wherein the electronic interface includes a charge transfer amplifier unit connected to a moving third electrode common to the sensor capacitors, an integrator unit connected to an output of the amplifier unit to integrate charges provided by the amplifier unit and to provide a measurement output voltage, and an excitation unit arranged between an output of the integrator unit and the sensor for inversely polarizing each fixed second electrode of the two capacitors in operating mode at a high voltage or a low voltage of a constant voltage source relative to a median rest voltage of the sensor between the high voltage and the low voltage, or for discharging each capacitor by the output voltage of the integrator unit; and (b) a multiplier unit for multiplying a bandgap voltage of a reference circuit by a determined factor from among several stored factors representative of a desired electrostatic force to be generated deliberately in order to produce a constant reference voltage to be added to or subtracted from the median rest voltage in order to polarize only one of the fixed second electrodes in each test phase of the electronic circuit, wherein the electronic circuit is suited for implementing the automatic test method according to claim 1.

8. The electronic circuit according to claim 7, wherein the electronic circuit further includes:

(c) two integrator units, each connected to the output of the amplifier unit to integrate alternately and cyclically charges provided by the amplifier unit and to provide a first measurement output voltage for the first integrator unit and a second measurement output voltage for the second integrator unit; and (d) two excitation units, of which the first excitation unit is arranged between an output of the first integrator unit and the sensor, and the second excitation unit is arranged between an output of the second integrator unit and the sensor, wherein the first excitation unit polarizes the fixed second electrodes of the two capacitors at the high voltage for one of the fixed second electrodes and at the low voltage for the other fixed second electrode, or discharges each capacitor by the output voltage of the first integrator unit, whereas the second excitation unit polarizes each fixed second electrode inversely to the first excitation unit with the low voltage for one of the fixed second electrodes and the high voltage for the other fixed second electrode, or discharges each capacitor by the output voltage of the second integrator unit.

9. The electronic circuit according to claim 7, wherein the electronic circuit further includes:

(c) a switch arranged between the output of the multiplier unit and one of the fixed second electrodes of the two capacitors to be polarized in each test phase, wherein said switch is controlled by clock signals that are being closed in each test phase, and wherein the multiplier unit is controlled by a selection signal for generating a constant reference voltage pulse added to or subtracted from the median rest voltage in order to adjust the electrostatic force to be generated in each test phase, wherein the median rest voltage has a determined time duration less than the duration of each test phase.

10. The electronic circuit according to claim 9, wherein the electronic circuit further includes:

(c) two integrator units, each connected to the output of the amplifier unit to integrate alternately and cyclically charges provided by the amplifier unit and to provide a first measurement output voltage for the first integrator unit and a second measurement output voltage for the second integrator unit; and (d) two excitation units, of which the first excitation unit is arranged between an output of the first integrator unit and the sensor, and the second excitation unit is arranged between an output of the second integrator unit and the sensor, wherein the first excitation unit polarizes the fixed second electrodes of the two capacitors at the high voltage for one of the fixed second electrodes and at the low voltage for the other fixed second electrode, or discharges each capacitor by the output voltage of the first integrator unit, whereas the second excitation unit polarizes each fixed second electrode inversely to the first excitation unit with the low voltage for one of the fixed second electrodes and the high voltage for the other fixed second electrode, or discharges each capacitor by the output voltage of the second integrator unit.

\* \* \* \* \*